Figure 1:
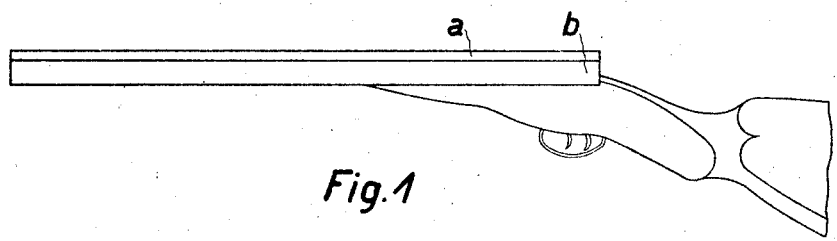

Sept. 8, 1925.

W. THORNER 1,552,895

SIGHTING TELESCOPE

Filed Aug. 29, 1921

Inventor:
Walther Thorner

Patented Sept. 8, 1925.

1,552,895

UNITED STATES PATENT OFFICE.

WALTHER THORNER, OF BERLIN, GERMANY.

SIGHTING TELESCOPE.

Application filed August 29, 1921. Serial No. 496,780.

(GRANTED UNDER THE PROVISIONS OF THE ACT OF MARCH 3, 1921, 41 STAT. L., 1313.)

*To all whom it may concern:*

Be it known that I, WALTHER THORNER, a citizen of the German Empire, and residing at Berlin, Germany, have invented a new and useful Sighting Telescope, (for which I have filed an application in Germany, September 22, 1913, Patent 272,102, and in France, July 1, 1920), of which the following is a specification.

Sighting by means of a telescope has the advantage over the sighting with the aid of a notch and sight that only one sighting mark is brought into coincidence with the aim and that this mark is sharply seen without strain of accommodation and simultaneously with the aim. However, there exists the drawback relatively to the use of a notch and sight inasmuch as the field of view is limited to a larger extent.

The object of the present invention is to also bring about the observation of only one sighting mark on the target without strain of accommodation in a well-known manner by means of a telescope, but to obviate the defect of the limited field of view by using the field of view surrounding the sighting telescope whilst sighting as a completion of the field of view seen in the telescope.

In order to attain this, the optical parts of the telescope (which may consist of lenses or of lenses and reflectors) are so chosen that the telescope has the magnifying power "one" and that the telescope casing is so constructed that from the position of the eye it does not substantially appear at a larger angle of view than the field of view visible in the ocular. The field of view of the free eye then adjoins the field of view of the telescope without any essential boundary line.

This also affords the possibility of almost lessening at will the field of view within the telescope without impairing the easy detection of the aim. Thereby the advantage is obtained that the telescope may be given an exceedingly long and narrow shape, so that its length exceeds the largest diameter by more than the twentyfold. Even if the largest diameter be only from 1/60 to 1/120 of the length, the target is still easily found. Consequently the focal length of the lenses and their radius of curvature can be selected in such a manner that also with a large distance from the eye (from 40 to 60 cm.) and illumination from behind there arise no objectionable reflections. Moreover, the telescope may directly rest with its full length on the barrel of the fire-arm in which case the front and the rear part terminate with the front and the rear end of the barrel. At the same time the telescope may be of such a thin construction that the outer shape of the fire-arm is almost not altered at all.

In order to be able to aim at larger distances in which case a considerable dip of the projectile takes place, the rear part of the telescope may be lifted in a known manner, whilst the front part rotates in a joint.

In order that the user may also be able to aim in those cases in which the observation through the telescope is impaired, it is possible to fit a notch and sight in addition to the telescope.

Any telescope unit magnification may be used.

In order to also be able to aim in the dark, the sighting mark may be coated in a known way with phosphorescent substances or such containing radium.

Figure 2:
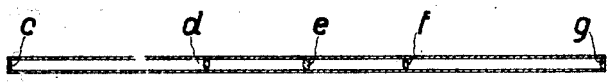

In the annexed drawing the invention is illustrated by a constructional example. Fig. 1 is an outer view of a sighting telescope fixed on a rifle, Fig. 2 is a section through the longitudinal axis of the sighting telescope, Fig. 3 shows the manner in which the telescope-image appears as a segment of the whole field of view.

The telescope *a* directly rests on the rifle-barrel *b* in its whole length, without altering the outer shape of the arm. *c* is an objective, *d* a collective, *e* a reversing lens, *f* a second collective and *g* an ocular. A sighting mark *h* (vide Fig. 3) is fixed on one of the two collectives.

Figure 3:
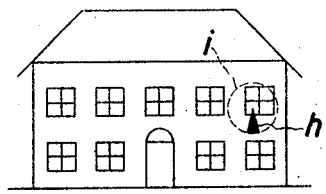

Fig. 3 shows a house, and the last window on the right in the upper floor might be aimed at. The sighting mark *h* appears lying on this window. The field of view of the telescope is but a small portion of the field of the free eye into which it fits without a gap. By *i* there is denoted the thin boundary line which entirely disappears with the accommodation for the distance.

I claim:

1. Sighting telescope consisting of a casing and an optical system contained therein, the said system at least comprising an objective, an ocular and a reversing lens system lying between the objective and the ocular, the magnifying power of the telescope having the value "one" and the casing not substantially appearing from the position of the eye at a larger angle of view than the field of view of the said telescope.

2. Sighting telescope consisting of a casing and an optical system contained therein, the said system being composed of an objective, a reversing lens and an ocular as well as of two collective lenses, disposed on the one and the other side each of the said reversing lens, and these five lenses being so chosen that the telescope has the magnifying power "one" and that its length exceeds the twentyfold of its largest diameter.

3. The combination of an ordnance piece with a sighting device therefor comprising a casing, a lens system having magnifying power of unity and including a known emblem in said casing, and means for erecting the image transmitted through the first member of said system.

4. In a sighting device for ordnance, the combination of a lens, a surface bearing a known emblem and located in the focal plane of said lens, and means for erecting the image and transmitting the image and emblem to the eye, said device having unity magnifying power.

5. In a collimating device for sighting with ordnance the combination of a casing, a pair of lenses therein for projecting an inverted image of a target, a known emblem in the focal plane of the first of said pair of lenses, and a second pair of lenses for transmitting the said image of said target and said emblem to the eye of the observer, and erecting the image of said target, said device having unity magnifying power.

6. The method of sighting, which consists in transmitting the image of the target with a known emblem projected on said image, through a system of lenses of unity magnifying power and erecting said image of the target.

WALTHER THORNER.